United States Patent
Wei et al.

(10) Patent No.: US 12,219,484 B2
(45) Date of Patent: Feb. 4, 2025

(54) WAKEUP SIGNAL BASED BEAM MANAGEMENT

(71) Applicant: QUALCOMM Incorporated, San Diego, CA (US)

(72) Inventors: Chao Wei, Beijing (CN); Le Liu, San Jose, CA (US); Alberto Rico Alvarino, San Diego, CA (US); Wanshi Chen, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/631,811

(22) PCT Filed: Sep. 4, 2020

(86) PCT No.: PCT/CN2020/113439
§ 371 (c)(1),
(2) Date: Jan. 31, 2022

(87) PCT Pub. No.: WO2021/043252
PCT Pub. Date: Mar. 11, 2021

(65) Prior Publication Data
US 2022/0400437 A1    Dec. 15, 2022

(30) Foreign Application Priority Data
Sep. 6, 2019  (WO) ............... PCT/CN2019/104663

(51) Int. Cl.
*H04W 52/02*    (2009.01)
*H04W 16/28*    (2009.01)
(Continued)

(52) U.S. Cl.
CPC ....... *H04W 52/0229* (2013.01); *H04W 16/28* (2013.01); *H04W 56/001* (2013.01); *H04W 68/005* (2013.01); *H04W 76/20* (2018.02)

(58) Field of Classification Search
CPC ............. H04W 52/0229; H04W 16/28; H04W 56/001; H04W 68/005; H04W 76/20;
(Continued)

(56) References Cited

U.S. PATENT DOCUMENTS 12,041,627 B2 *  7/2024  Kim ....................... H04W 4/70
2019/0254110 A1  8/2019  He et al.
(Continued)

FOREIGN PATENT DOCUMENTS

WO        2018169649 A1    9/2018
WO    WO-2019032280 A1    2/2019
(Continued)

OTHER PUBLICATIONS

Supplementary Partial European Search Report—EP20861925—Search Authority—Munich—Sep. 12, 2023.
(Continued)

*Primary Examiner* — Afshawn M Towfighi
(74) *Attorney, Agent, or Firm* — Harrity & Harrity, LLP

(57) ABSTRACT

A method, an apparatus, and a computer program product for wireless communication are provided. The apparatus may transmit a plurality of repetitions of a cell-common wakeup signal (WUS) on a different transmit beam in each monitoring occasion of one or more monitoring occasions. Another apparatus may beam sweep receive beams in each monitoring occasion to receive the cell-common WUS and to identify a transmit beam/receive beam pair for receiving a paging communication in a paging occasion associated with the transmit beam.

30 Claims, 13 Drawing Sheets

(51) Int. Cl.
*H04W 56/00* (2009.01)
*H04W 68/00* (2009.01)
*H04W 76/20* (2018.01)

(58) Field of Classification Search
CPC ......... H04W 52/0219; H04W 52/0235; H04W 52/028; H04W 68/025; H04W 52/0245; H04W 52/0274; H04W 52/0216; H04W 76/28; H04B 7/0695; H04B 7/088; Y02D 30/70
See application file for complete search history.

(56) References Cited

U.S. PATENT DOCUMENTS

| | | | |
|---|---|---|---|
| 2021/0127335 A1* | 4/2021 | Rostami | H04W 52/0229 |
| 2022/0086754 A1* | 3/2022 | Pezeshki | H04W 72/046 |
| 2024/0155498 A1* | 5/2024 | Abedini | H04W 74/0833 |

FOREIGN PATENT DOCUMENTS

| | | |
|---|---|---|
| WO | WO-2019040369 A1 | 2/2019 |
| WO | 2020029245 A1 | 2/2020 |
| WO | 2020060696 A1 | 3/2020 |

OTHER PUBLICATIONS

Supplementary European Search Report—EP20861925—Search Authority—Munich—Dec. 13, 2023.
International Search Report and Written Opinion—PCT/CN2019/104663—ISAEPO—May 26, 2020.
International Search Report and Written Opinion—PCT/CN2020/113439—ISA/EPO—Dec. 8, 2020.
Qualcomm Incorporated: "Paging Design Consideration," R1-1713378, 3GPP TSG—RAN WG1 Meeting #90, Jun. 21-25, 2017 (Jun. 25, 2017) section 4, 7 pages.
Qualcomm Incorporated: "PDCCH-Based Power Saving Channel Design", 3GPP Draft, 3GPP TSG-RAN WG1 #97, R1-1907294, PDCCH-based Power Saving Channel Design, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728734, 16 Pages, Retrieved from the Internet: URL: http://www.3gpp.org/ftp/Meetings%5F3GPP%5FSYNC/RAN1/Docs/R1%2D1907294%2Ezip [retrieved on May 13, 2019] paragraph [2.2.3.1]-paragraph [2.2.3.3], p. 1-p. 15, Section 2.3.2, Section 2.1.
Qualcomm Incorporated: "Triggering Adaptation of UE Power Consumption Characteristics", 3GPP Draft, 3GPP TSG-RAN WG1 Meeting #94bis, R1-1811283, Triggering Mechanism for Adaptation, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518686, 12 Pages, Retrieved from the Internet: URL: http://www.3gpp.org/ftp/tsg%5Fran/WG1%5FRL1/TSGR1%5F94b/Docs/R1%2D1811283%2Ezip [retrieved on Sep. 29, 2018], The whole document, figures 4, 5, pp. 1-3.5.
Qualcomm Incorporated: "Triggering Adaptation of UE Power Consumption Characteristics", 3GPP TSG-RAN WG1 Meeting #95, 3GPP Draft, R1-1813448 Triggering Mechanism for Adaptation, 3rd Generation Partnership Project (3GPP), Mobile Competence Centre, 650, Route Des Lucioles, F-06921 Sophia-Antipolis Cedex, France, vol. RAN WG1, No. Spokane, Washington, USA, Nov. 12, 2018-Nov. 16, 2018, 17 Pages, Nov. 11, 2018 (Nov. 11, 2018), XP051555487, Retrieved from the Internet: URL: http://www.3gpp.org/ftp/Meetings%5F3GPP%5FSYNC/RAN1/Docs/R1%2D1813448%2Ezip [retrieved on Nov. 11, 2018] paragraph 3.1.1.1, paragraph 3.1.1.2, figure 2.
Samsung: "Paging in NR," R1-1700823, 3GPP TSG-RAN WG2 Meeting# 97, Feb. 13-17, 2017, (Feb. 17, 2017) section 2, 5 pages.
Samsung: "PDCCH-Based Power Saving Signal/Channel", 3GPP Draft, 3GPP TSG RAN WG1 #97, R1-1906980, On PDCCH-Based Power Saving Signal, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728429, 12 Pages.
Vivo: "PDCCH-Based Power Saving Signal/Channel", R1-1906170, 3GPP TSG RAN WG1 #97, Reno, USA, May 13-17, 2019, Section 2.1.2, Section 2, 10 pages.

* cited by examiner

WAKEUP SIGNAL BASED BEAM MANAGEMENT

CROSS-REFERENCE TO RELATED APPLICATIONS

This application is a 371 national stage of PCT Application No. PCT/CN2020/113439 filed on Sep. 4, 2020, entitled "WAKEUP SIGNAL BASED BEAM MANAGEMENT," which claims priority to International Patent Application No. PCT/CN2019/104663, filed on Sep. 6, 2019, entitled "WAKEUP SIGNAL BASED BEAM MANAGEMENT." The disclosure of the prior Applications are considered part of and are hereby expressly incorporated by reference herein.

BACKGROUND

Field

Aspects of the present disclosure generally relate to wireless communication and to techniques and apparatuses for wakeup signal based beam management.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some cases, a user equipment (UE) may use synchronization signal blocks (SSBs) associated with a plurality of transmit beams of a base station (BS) for purposes of beam management, which may include identifying a transmit beam and a receive beam on which to receive a paging communication from the BS. In this case, the BS may beam sweep the transmit beams by transmitting a plurality of SSB bursts, where each SSB burst includes a transmission of an SSB on each of the plurality of transmit beams. The UE may beam sweep receive beams across SSB bursts prior to a paging occasion such that the UE receives each SSB burst with a different receive beam and identifies a beam pair for receiving a paging communication in the paging occasion. As a result, the UE is to measure multiple SSB bursts, which may cause the UE to be active for a long period of time prior to a paging occasion because the periodicity of each SSB burst may be 20 milliseconds, multiple radio frames, or longer. This may cause degraded performance and/or accelerated battery drain at the UE, particularly if the UE is an IoT device or another type of low-power UE with limited battery and/or processing capability. In some cases, the BS may transmit the paging communication in a bandwidth part (BWP) that is different from a BWP in which the BS transmits an SSB. This causes the UE to switch the BWP in order to identify a beam pair for receiving the paging communications, which may further increase power consumption and may increase processing resource consumption of the UE.

Some aspects described herein provide techniques and apparatuses for wakeup signal (WUS) based beam management. In some aspects, a BS may transmit a WUS with repetition on a plurality of transmit beams such that the UE may use the WUS repetitions to identify a beam pair for receiving a paging communication from the BS. In this case, the BS may transmit the WUS with repetition on each transmit beam in a respective slot, and the UE may beam sweep receive beams in each slot to receive the WUS and to identify a beam pair for receiving the paging communication. The slots carrying the WUS repetitions on the plurality of transmit beams may be included in 1-2 radio frames to reduce the measurement time for the UE and to reduce the amount of time that the UE is active prior to the paging occasion, which reduces the consumption of processing resources and/or power of the UE while in an idle mode. In some aspects, the BS may transmit the paging communication and the plurality of repetitions of the WUS in a same bandwidth part to reduce BWP switching of the UE.

In an aspect of the disclosure, a method, a user equipment (UE), a base station (BS), an apparatus, and a computer program product are provided.

In some aspects, the method may by performed by a UE. The method may include receiving, from a BS and using a plurality of receive beams, a plurality of repetitions of a cell-common WUS transmitted on a transmit beam in a monitoring occasion; identifying a beam pair based at least in part on the plurality of repetitions of the cell-common WUS, wherein the beam pair includes the transmit beam and a receive beam of the plurality of receive beams; and receiving, using the receive beam, a paging communication transmitted on the transmit beam.

In some aspects, the UE may include a memory and one or more processors operatively coupled to the memory. The memory and the one or more processors may be configured to receive, from a BS and using a plurality of receive beams, a plurality of repetitions of a cell-common WUS transmitted on a transmit beam in a monitoring occasion; identify a beam pair based at least in part on the plurality of repetitions of the cell-common WUS, wherein the beam pair includes the transmit beam and a receive beam of the plurality of receive beams; and receive, using the receive beam, a paging communication transmitted on the transmit beam.

In some aspects, the apparatus may include means for receiving, from a BS and using a plurality of receive beams, a plurality of repetitions of a cell-common WUS transmitted on a transmit beam in a monitoring occasion; means for identifying a beam pair based at least in part on the plurality of repetitions of the cell-common WUS, wherein the beam pair includes the transmit beam and a receive beam of the plurality of receive beams; and means for receiving, using the receive beam, a paging communication transmitted on the transmit beam.

In some aspects, the computer program product may include a non-transitory computer-readable medium storing one or more instructions. The one or more instructions, when executed by one or more processors of a UE, may cause the one or more processors to receive, from a BS and using a plurality of receive beams, a plurality of repetitions of a cell-common WUS transmitted on a transmit beam in a monitoring occasion; identify a beam pair based at least in part on the plurality of repetitions of the cell-common WUS, wherein the beam pair includes the transmit beam and a receive beam of the plurality of receive beams; and receive, using the receive beam, a paging communication transmitted on the transmit beam.

In some aspects, the method may by performed by a BS. The method may include transmitting, using a first transmit beam, a first plurality of repetitions of a cell-common WUS in a first monitoring occasion; transmitting, using a second transmit beam, a second plurality of repetitions of the cell-common WUS in a second monitoring occasion; and transmitting a paging communication using the first transmit beam and the second transmit beam.

In some aspects, the BS may include a memory and one or more processors operatively coupled to the memory. The memory and the one or more processors may be configured to transmit, using a first transmit beam, a first plurality of repetitions of a cell-common WUS in a first monitoring occasion; transmit, using a second transmit beam, a second plurality of repetitions of the cell-common WUS in a second monitoring occasion; and transmit a paging communication using the first transmit beam and the second transmit beam.

In some aspects, the apparatus may include means for transmitting, using a first transmit beam, a first plurality of repetitions of a cell-common WUS in a first monitoring occasion; means for transmitting, using a second transmit beam, a second plurality of repetitions of the cell-common WUS in a second monitoring occasion; and means for transmitting a paging communication using the first transmit beam and the second transmit beam.

In some aspects, the computer program product may include a non-transitory computer-readable medium storing one or more instructions. The one or more instructions, when executed by one or more processors of a BS, may cause the one or more processors to transmit, using a first transmit beam, a first plurality of repetitions of a cell-common WUS in a first monitoring occasion; transmit, using a second transmit beam, a second plurality of repetitions of the cell-common WUS in a second monitoring occasion; and transmit a paging communication using the first transmit beam and the second transmit beam.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
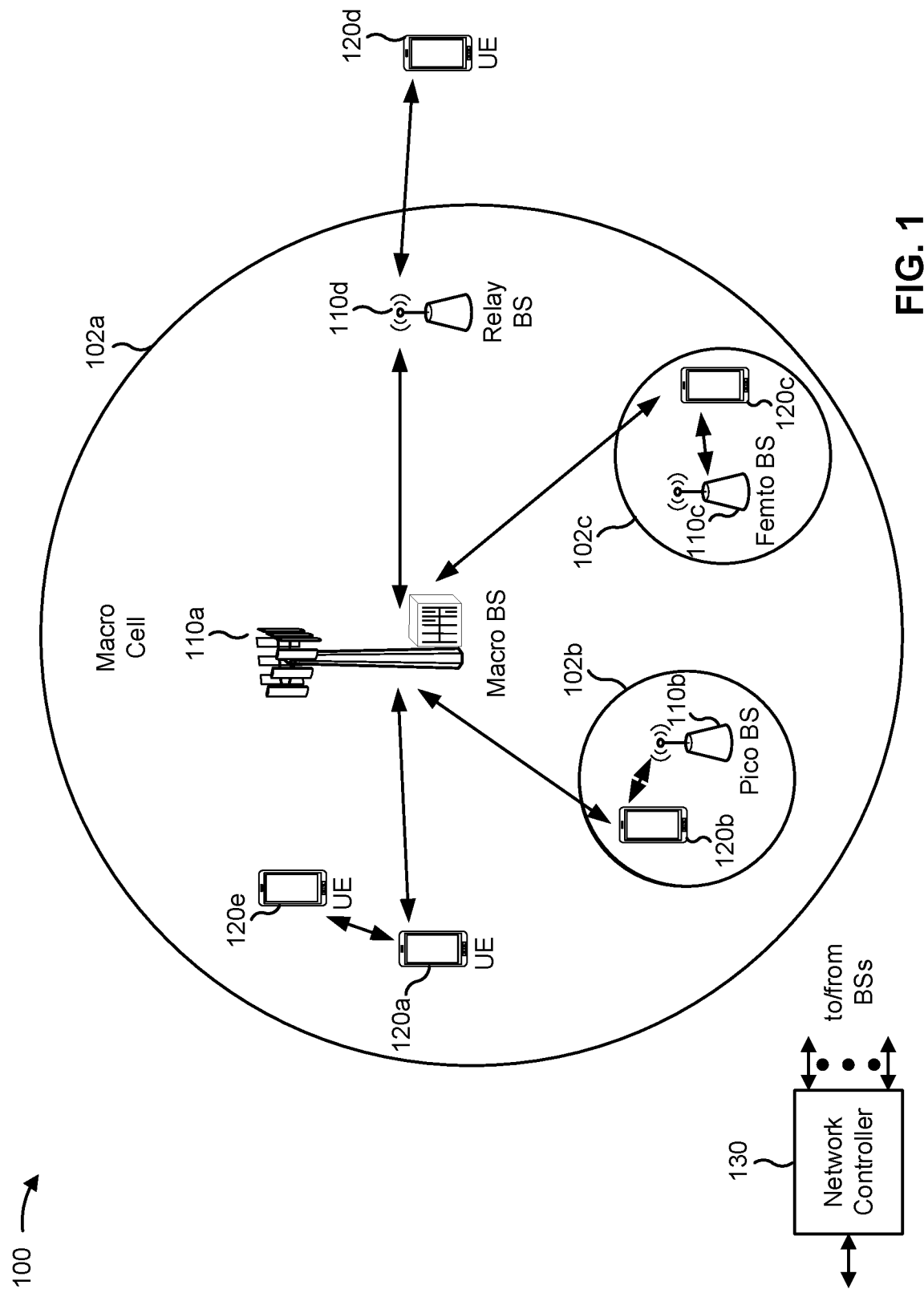
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some cases, a UE 120 may perform a discontinuous reception (DRX) operation to conserve battery life of the UE. In some cases, the UE 120 may initiate the DRX operation in various operational modes, such as a connected mode (e.g., a radio resource control (RRC) connected mode), an inactive mode (e.g., an RRC inactive mode), an idle mode (e.g., an RRC idle mode), and/or the like.

In some cases, when a UE 120 performs the DRX operation in an idle mode, the DRX operation may include transitioning to a DRX sleep mode for a DRX sleep duration. In the DRX sleep mode, the UE 120 may refrain from transmitting or receiving communications, may deactivate particular subcarriers or component carriers, may deactivate one or more components of the UE 120, and/or the like. Moreover, the DRX operation may include periodically transitioning out of the DRX sleep mode and into a DRX on mode for a paging occasion to monitor for paging communications from a BS 110.

A UE 120 may perform a DRX operation based at least in part on a DRX cycle. A DRX cycle may include a combination of a DRX on mode and a DRX sleep mode. For example, a DRX cycle may include a DRX sleep duration followed by a paging occasion. As another example, a DRX cycle may include a paging occasion followed by a DRX sleep duration.

As indicated above, FIG. 1 is provided merely as an example. Other examples may differ from what is described with regard to FIG. 1.

Figure 2:
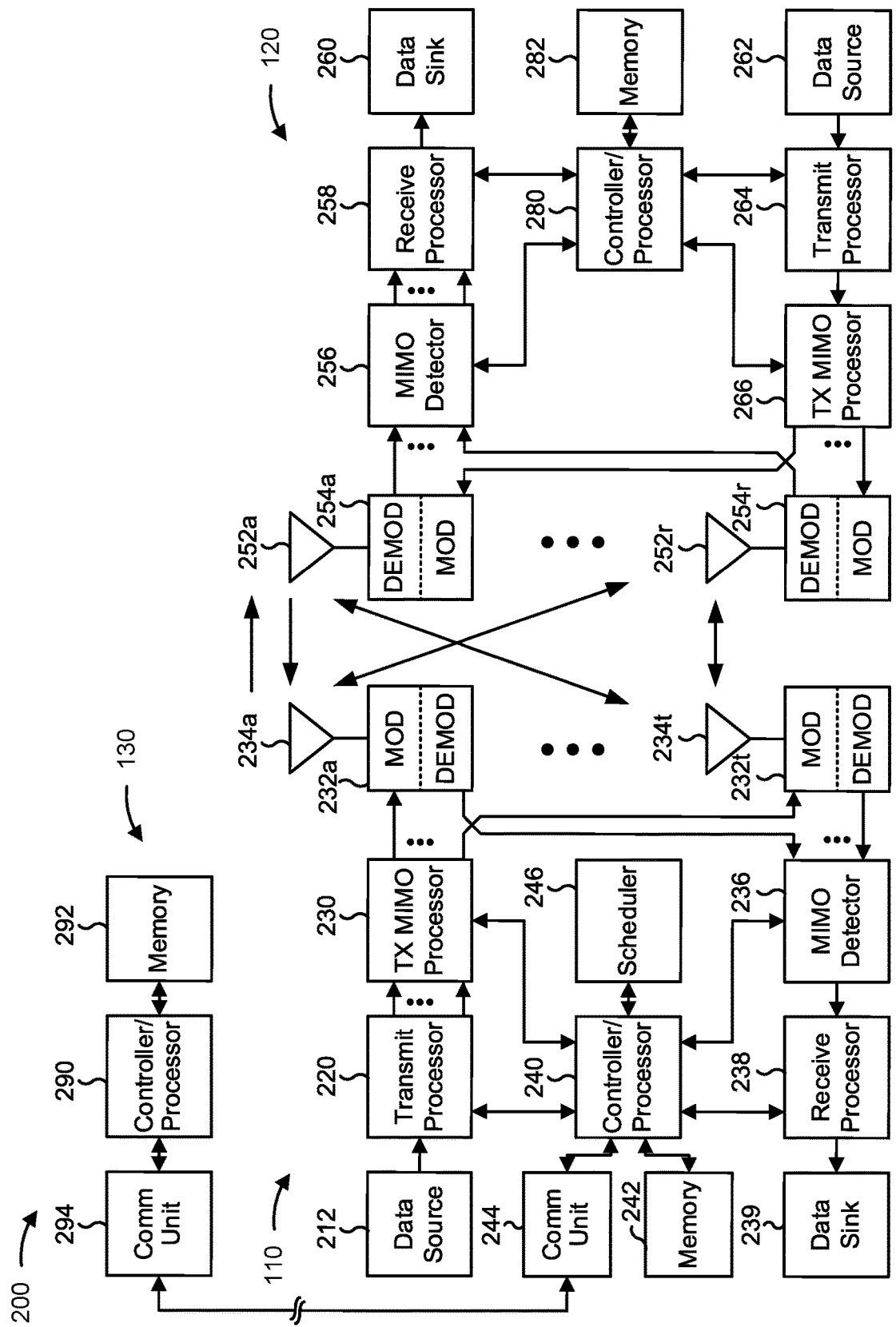
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with wakeup signal (WUS) based beam management, as described in more detail elsewhere herein. For example, controller/processor 240 of base station 110, controller/processor 280 of UE 120, and/or any other component(s) of FIG. 2 may perform or direct operations of, for example, method 500 of FIG. 5, method 600 of FIG. 6, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHz may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

In some wireless network deployments, such as a 5G/NR deployment, a BS may support multi-beam paging operation. In this case, the BS may transmit a paging communication across a plurality of physical downlink control channel (PDCCH) monitoring occasions in a paging occasion, where each PDCCH monitoring occasion is associated with a transmit beam (Tx beam) of the BS and an associated synchronization signal block (SSB). In some cases, a UE may use the SSBs associated with each transmit beam for purposes of beam management, which may include identifying a transmit beam and a receive beam on which to receive a paging communication from the BS based at least in part on measuring the SSBs on various combinations of transmit beams and receive beams.

In this case, the BS may beam sweep the transmit beams by transmitting a plurality of SSB bursts, where each SSB burst includes a transmission of an SSB on each of the plurality of transmit beams. The UE may beam sweep receive beams (Rx beams) across SSB bursts prior to a paging occasion such that the UE receives each SSB burst with a different receive beam and identifies a beam pair (which may include a transmit beam and a receive beam) for receiving a paging communication in the paging occasion. As a result, the UE is to measure multiple SSB bursts, which may cause the UE to be active for a long period of time prior to a paging occasion because the periodicity of each SSB burst may be 20 milliseconds (ms), multiple radio frames, or longer. This may cause degraded performance and/or accelerated battery drain at the UE, particularly if the UE is an IoT device or another type of low-power UE with limited battery and/or processing capability. In some cases, the BS may transmit the paging communication in a bandwidth part (BWP) that is different from a BWP in which the BS transmits an SSB. This causes the UE to switch the BWP in order to identify a beam pair for receiving the paging communications, which may further increase power consumption and may increase processing resource consumption of the UE.

Some aspects described herein provide techniques and apparatuses for WUS based beam management. In some aspects, the UE may transition to the DRX on mode based at least in part on receiving a WUS from a BS, which may indicate that the BS is to transmit a paging communication to the UE in a subsequent paging occasion. In some cases, the UE may monitor a time-domain resource and/or frequency-domain resource (which may be referred to as a WUS occasion) in which a BS may transmit a WUS. Thus, if the UE does not receive a WUS when monitoring a WUS occasion, the UE refrains from transitioning to a DRX on mode in a corresponding paging occasion. Accordingly, the BS may use the WUS to increase the efficiency and power-saving of DRX operation by reducing the quantity of times that the UE transitions to the DRX on mode.

Moreover, the BS may transmit a WUS with repetition on a plurality of transmit beams such that the UE may use the WUS repetitions to identify a beam pair for receiving a paging communication from the BS. In this case, the BS may transmit the WUS with repetition on each transmit beam in a respective slot, and the UE may beam sweep receive beams in each slot to receive the WUS and to identify a beam pair for receiving the paging communication. The slots carrying the WUS repetitions on the plurality of transmit beams may be included in 1-2 radio frames to reduce the measurement time for the UE and to reduce the amount of time that the UE is active prior to the paging occasion, which reduces the consumption of processing resources and/or power of the UE while in an idle mode.

Figure 3:
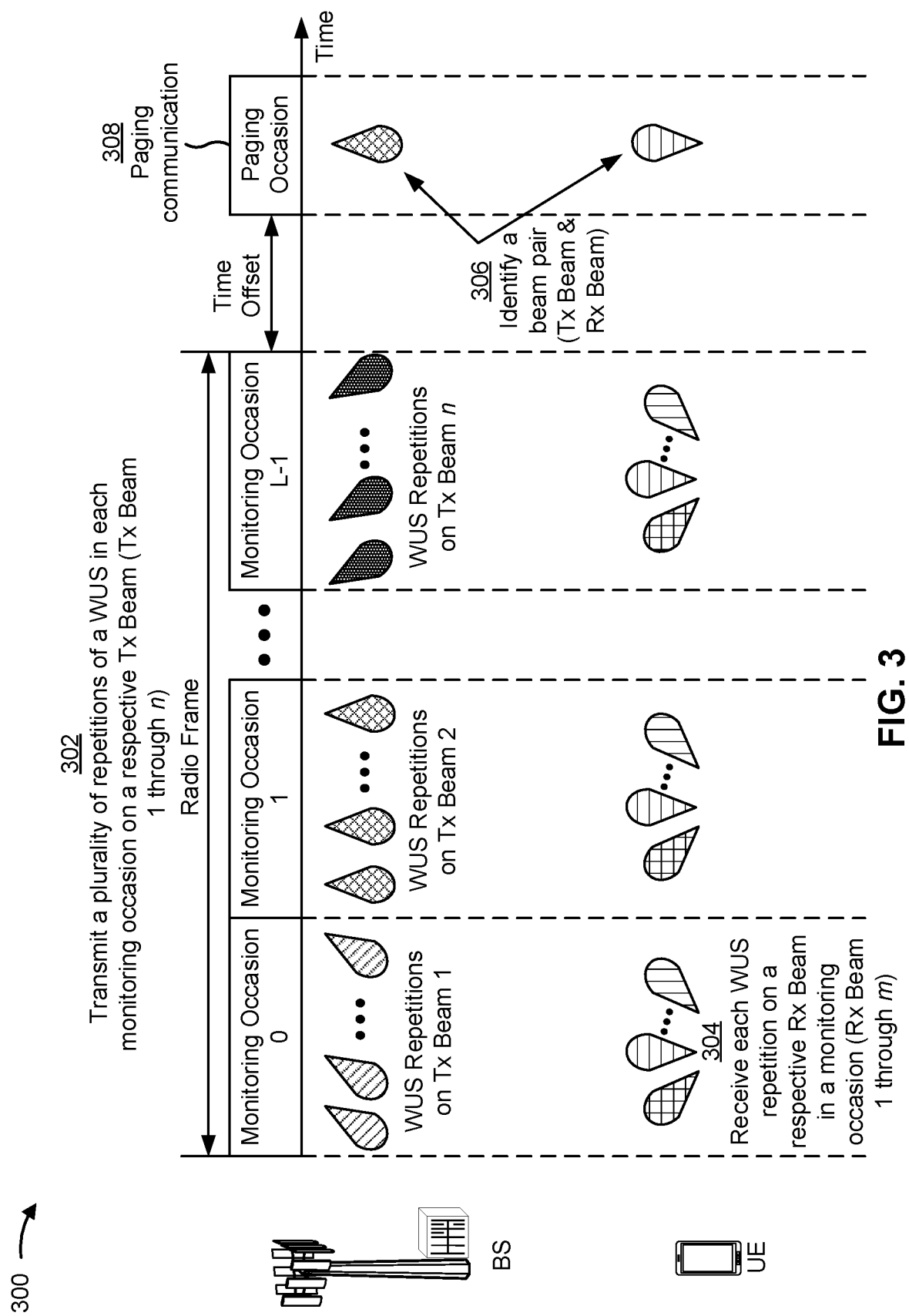
FIG. 3 is a diagram illustrating one or more examples of wakeup signal (WUS) based beam management.

FIG. 3 is a diagram illustrating one or more examples 300 of WUS based beam management. As shown in FIG. 3, example(s) 300 may include communication between a BS (e.g., BS 110) and a UE (e.g., UE 120). In some aspects, the BS and the UE may be included in a wireless network. In some aspects, the UE may operate in an idle mode and may perform DRX operation while in the idle mode. In this case, the BS may transmit, based at least in part on determining to transmit the paging communication to the UE (e.g., to page the UE while the UE is in the idle mode), a WUS to the UE to indicate that the UE is to transition to a DRX on mode to monitor a subsequent paging occasion for the paging communication. Conversely, if no paging communication is to be transmitted to the UE in a particular paging occasion, the BS may refrain from transmitting a WUS to the UE in a WUS occasion associated with the paging occasion.

At 302, to transmit a WUS to the UE to indicate that the UE is to transition to a DRX on mode to monitor a subsequent paging occasion for a paging communication, the BS may transmit a plurality of repetitions of the WUS in each monitoring occasion (e.g., a time duration in which a UE is to monitor for a WUS) of a plurality of monitoring occasions in one or more radio frames (e.g., monitoring occasion 0 through monitoring occasion L−1). In some aspects, the WUS may be a cell-common WUS (e.g., a WUS that is common for a plurality of UEs in a cell of the BS). In some aspects, the plurality of monitoring occasions may be time division multiplexed in the one or more radio frames, in one or more slots, and/or the like. In some aspects, the plurality of monitoring occasions (or at least a subset thereof) may be included in different slots. In some aspects, the BS may transmit the plurality of repetitions of the WUS on a respective transmit beam in each slot of the plurality of monitoring occasions (e.g., Tx beam 1 through Tx beam n). For example, the BS may transmit a first plurality of repetitions of the WUS in monitoring occasion 0 of a radio frame on a first transmit beam (e.g. Tx beam 1), may transmit a second plurality of repetitions of the WUS in monitoring occasion 1 of the radio frame on a second transmit beam (e.g., Tx beam 2), and so on. In this way, the BS beam sweeps the WUS on the transmit beams configured for a cell of the BS and across the monitoring occasions included in the one or more radio frames.

In some aspects, the BS may transmit the plurality of repetitions of the WUS in a bandwidth part (BWP) that is different from a BWP in which the BS transmits an SSB. In some aspects, the BS may transmit a plurality of repetitions of the WUS on a transmit beam in a monitoring occasion such that each repetition of the WUS is transmitted on the transmit beam in a respective OFDM symbol in the monitoring occasion. In this case, the BS may transmit the plurality of repetitions of the WUS in the monitoring occasion with the same downlink spatial domain transmission filter. In some aspects, the BS may transmit the paging communication and the plurality of repetitions of the WUS in a same bandwidth part to reduce BWP switching of the UE.

In some aspects, the WUS may include a WUS sequence that is mapped to each frequency tone in one or more resource blocks (e.g., physical resource blocks) in one or more OFDM symbols. In some aspects, the WUS may include a single-port channel state information reference signal (CSI-RS) or another type of reference signal that is mapped to one or more frequency tones (e.g., every 4 frequency tones) in one or more resource blocks in one or more OFDM symbols. In some aspects, the WUS may include a PDCCH-based WUS with cyclic redundancy check (CRC) scrambled by a common radio network temporary identifier (RNTI) that is based on a physical cell identifier, a UE-group identifier, or configured by higher layer signaling.

In some aspects, the BS may configure the WUS to be cell-specific (e.g., specific to the cell of the BS). In some aspects, the BS may configure the WUS to be spatially quasi-co-located (QCL'ed) with an SSB associated with a transmit beam on which the WUS is transmitted. For example, the BS may configure the WUS to be spatially QCL'ed with an SSB associated with Tx beam 1 for the first plurality of repetitions of the WUS on Tx beam 1, may configure the WUS to be spatially QCL'ed with an SSB associated with Tx beam 2 for the second plurality of repetitions of the WUS on Tx beam 2, and so on.

In some aspects, the radio frame and/or monitoring occasions in which the BS transmits the plurality of repetitions of the WUS may be based at least in part on a time offset between the radio frame (and/or the monitoring occasions) and a paging frame, a paging occasion, and/or a PDCCH monitoring occasion in which the paging communication is to be transmitted. For example, the time offset may be between a last monitoring occasion in which the BS transmits the plurality of repetitions of the WUS and a starting OFDM symbol of the first PDCCH monitoring occasion of the first paging occasion in the paging frame. In some aspects, the time offset may be a non-zero time duration and may be configured such that the duration of the time offset permits the UE to identify a beam pair from the plurality of transmit beams and a plurality of receive beams associated with the UE before receiving the paging communication.

As 304, to perform beam management for receiving the paging communication, the UE may receive each WUS repetition on a respective receive beam in a monitoring occasion. In this case, the UE may beam sweep receive beams associated with the UE (e.g., Rx beam 1 through Rx beam m) in a same monitoring occasion to receive a plurality of repetitions of the WUS transmitted from the BS on a same transmit beam in the monitoring occasion. Moreover, the UE may beam sweep the plurality of receive beams in each monitoring occasion in which a plurality of repetitions of the WUS is transmitted. In this case, the UE may beam sweep Rx beam 1 through Rx beam m to receive the first plurality of repetitions of the WUS transmitted on Tx beam 1 in monitoring occasion 0, may beam sweep Rx beam 1 through Rx beam m to receive the second plurality of repetitions of the WUS transmitted on Tx beam 2 in monitoring occasion 1, and so on.

At 306, the UE may perform beam management by identifying a beam pair for receiving the paging communication based at least in part on the plurality of repetitions of the WUS transmitted across the plurality of monitoring occasions. The beam pair may include a transmit beam identified from the plurality of transmit beams associated with the BS, and a receive beam identified from the plurality of receive beams associated with the UE.

In some aspects, the UE may identify the beam pair by performing one or more measurements associated with the plurality of repetitions of the WUS transmitted across the plurality of the monitoring occasions. The one or more measurements may include one or more RSRP measurements, one or more RSSI measurements, one or more RSRQ measurements, one or more CQI measurements, one or more signal-to-noise ratio (SNR) measurements, one or more signal-to-interference-plus-noise ratio (SINR) measurements, other types of signal strength and/or signal quality measurements, and/or the like. In this case, the UE may perform the one or more measurements for each transmit beam/receive beam pair on which a repetition of the WUS was transmitted and received. For example, the UE may perform the one or more measurements for Tx beam 1/Rx beam 1, Tx beam 1/Rx beam 2, Tx beam 2/Rx beam 1, Tx beam 2/Rx beam 2, and so on to Tx beam n/Rx beam m.

In some aspects, the UE may identify the beam pair associated with the best measurement results, associated with measurement results that satisfy one or more measurement thresholds (e.g., an RSRP threshold, an RSSI threshold, an RSRQ threshold, a CQI threshold, an SNR threshold, an SINR threshold, and/or the like), and/or the like.

At 308, the BS may transmit the paging communication in a paging occasion associated with the WUS, and the UE may receive the paging communication in the paging occasion. For example, the BS may transmit the paging communication in one or more of PDCCH monitoring occasions associated with the WUS, in one or more paging occasions associated with the WUS, in one or more paging frames associated with the WUS, and/or the like. In this case, the BS may transmit the paging communication on the plurality of the transmit beams. In some aspects, the BS may transmit the paging communication in each of the PDCCH monitoring occasions using a respective transmit beam. In some aspects, the BS may transmit the paging communication in two or more of the PDCCH monitoring occasions using the same transmit beam. In some aspects, the BS may transmit the paging communication across the plurality of transmit beams in the same frequency range (e.g. in a same bandwidth part) in which the plurality of repetitions of the WUS were transmitted to reduce radio frequency (RF) switching or BWP switching of the UE, which may further increase power saving and may reduce processing resource consumption of the UE.

In some aspects, the BS may transmit the paging communication in the same BWP as the plurality of repetitions of the WUS. In some aspects, the BS may transmit the paging communication in a BWP that is different from the BWP in which the BS transmitted the plurality of repetitions of the WUS. In some aspects, the BS may transmit the paging communication in a BWP that is different from the BWP in which the BS transmits an SSB.

In some aspects, the UE may receive the paging communication in the paging occasion using the identified beam pair. In this case, the UE may identify the paging frame associated with the WUS, may identify the paging occasion associated with the WUS (e.g., the paging occasion included in the paging frame), and may identify the PDCCH monitoring occasion, included in the paging occasion, in which the BS transmitted the paging communication using the transmit beam included in the beam pair. The UE may receive the paging communication transmitted on the transmit beam in the PDCCH monitoring occasion using the receive beam included in the beam pair.

In this way, the BS may transmit a WUS with repetition on a plurality of transmit beams such that the UE may use the WUS repetitions to identify a beam pair for receiving a paging communication from the BS. The BS may transmit the WUS with repetition on each transmit beam in a respective monitoring occasion, and the UE may beam sweep receive beams in each monitoring occasion to receive the WUS and to identify a beam pair for receiving the paging communication. The monitoring occasions carrying the WUS repetitions on the plurality of transmit beams may be included in 1-2 radio frames to reduce the measurement time for the UE and to reduce the amount of time that the UE is active prior to the paging occasion, which reduces the consumption of processing resources and/or power of the UE while in an idle mode.

As indicated above, FIG. 3 is provided as one or more examples. Other examples may differ from what is described with respect to FIG. 3.

FIGS. 4A-4D are diagrams illustrating examples 400 of WUS configurations for WUS based beam management. In some aspects, the example WUS configurations illustrated in FIGS. 4A-4D may be used by a BS (e.g., BS 110) and a UE (e.g., UE 120) to transmit and/or receive a plurality of repetitions of a WUS, to transmit and/or receive one or more paging communications, and/or the like.

Figure 4A:
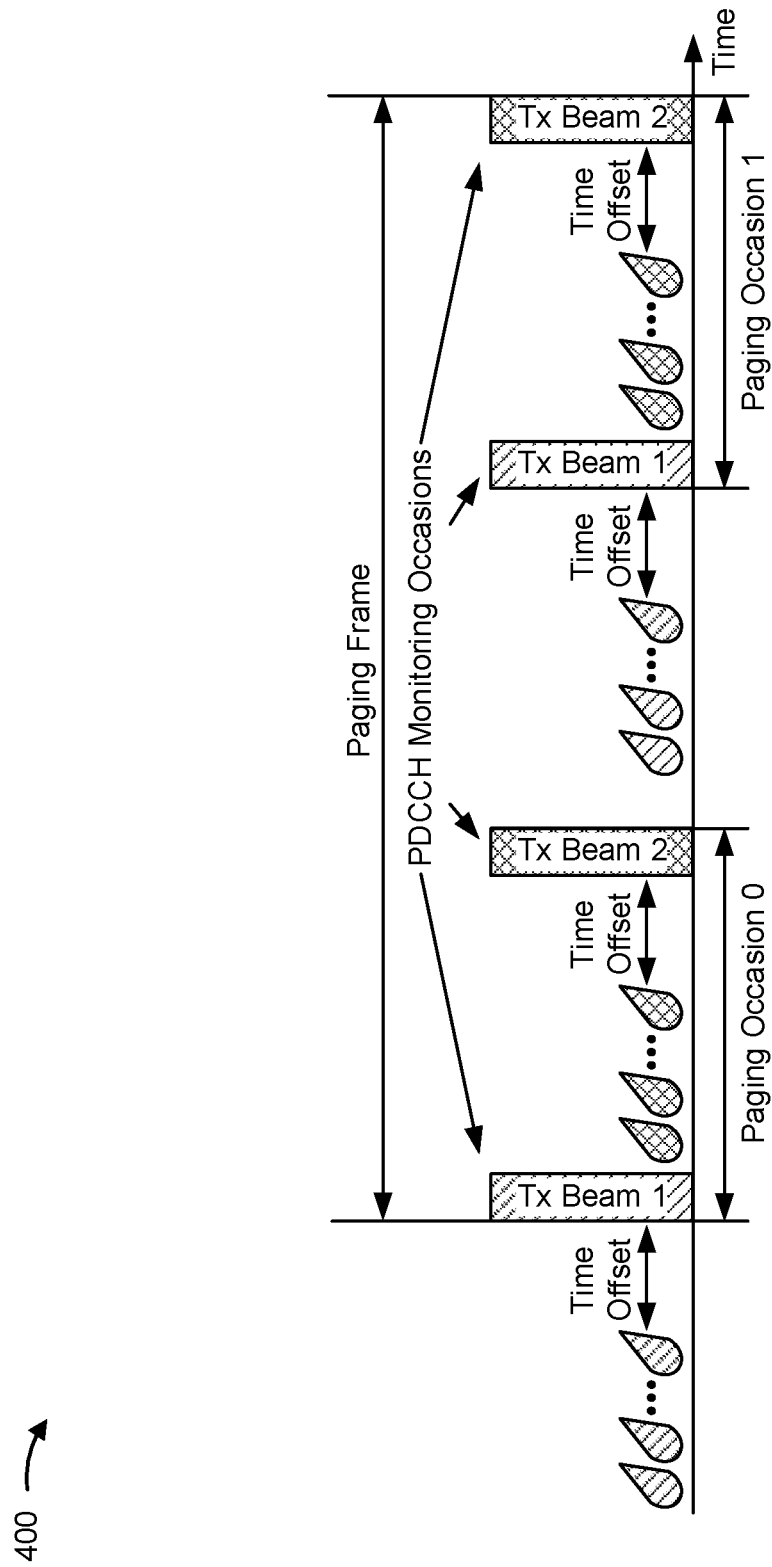
FIGS. 4A-4D are diagrams illustrating examples of WUS configurations for WUS based beam management.

As shown in the example illustrated in FIG. 4A, a WUS configuration may include a paging frame that includes a plurality of paging occasions (e.g., paging occasion 0, paging occasion 1, and so on). Each of the paging occasions may include a plurality of PDCCH monitoring occasions. Each of the PDCCH monitoring occasions included in a paging occasion may be associated with a respective transmit beam of a BS (e.g., Tx beam 1, Tx beam 2, and so on). In some aspects, each paging occasion may be associated with a different UE or a different group of UEs.

As further shown in the example illustrated in FIG. 4A, a WUS configuration may include a plurality of repetitions of a WUS associated with the plurality of PDCCH monitoring occasions and a time offset between each plurality of repetitions of the WUS and an associated PDCCH monitoring occasion. In particular, FIG. 4A illustrates an example WUS configuration that includes a 1-to-1 mapping of pluralities of repetitions of a WUS to paging occasions and PDCCH monitoring occasions (e.g., where a WUS, or a particular plurality of repetitions of the WUS is specific to a particular paging occasion). For example, a BS may transmit a plurality of repetitions of a WUS for the PDCCH monitoring occasion associated with Tx beam 1 and included in in paging occasion 0, may transmit a plurality of repetitions of a WUS for the PDCCH monitoring occasion associated with Tx beam 2 and included in in paging occasion 0, may transmit a plurality of repetitions of a WUS for the PDCCH monitoring occasion associated with Tx beam 1 and included in in paging occasion 1, may transmit a plurality of repetitions of a WUS for the PDCCH monitoring occasion associated with Tx beam 2 and included in in paging occasion 1, and so on. In some aspects, the respective time offsets between each plurality of repetitions of the WUS and an associated PDCCH monitoring occasion may be the same duration.

Figure 4B:
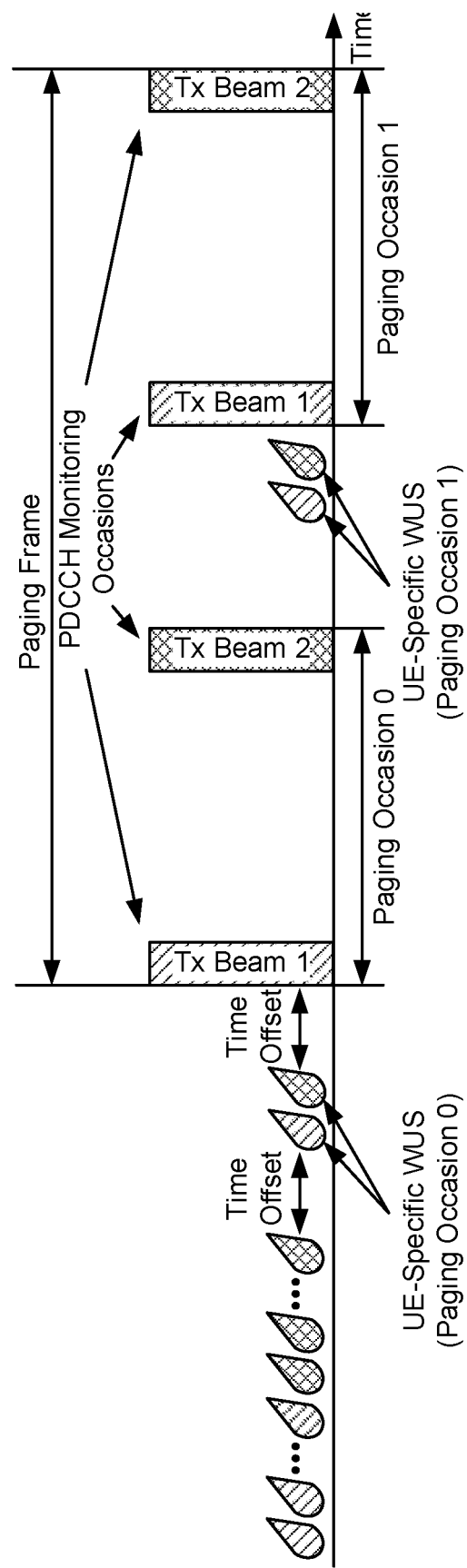

As shown in the example illustrated in FIG. 4B, a WUS configuration may include a paging frame that includes a plurality of paging occasions (e.g., paging occasion 0, paging occasion 1, and so on). Each of the paging occasions may include a plurality of PDCCH monitoring occasions. Each of the PDCCH monitoring occasions included in a paging occasion may be associated with a respective transmit beam of a BS (e.g., Tx beam 1, Tx beam 2, and so on). In some aspects, each paging occasion may be associated with a different UE or a different group of UEs.

As further shown in the example illustrated in FIG. 4B, a WUS configuration may include a plurality of repetitions of a WUS associated with the plurality of PDCCH monitoring occasions and a time offset between a cell-common WUS and a starting symbol of the paging frame or paging occasion. In particular, FIG. 4B illustrates an example WUS configuration that includes a 1-to-N mapping of pluralities of repetitions of a WUS to paging occasions and PDCCH monitoring occasions (e.g., where a WUS, or a particular plurality of repetitions of the WUS, is associated with a plurality of paging occasions). For example, a first plurality of repetitions of the WUS may be associated with all PDCCH monitoring occasions associated with Tx beam 1 (e.g., all PDCCH monitoring occasions across all paging occasions included in the paging frame), a second plurality of repetitions of the WUS may be associated with all PDCCH monitoring occasions associated with Tx beam 2, and so on. In this case, the 1-to-N mapping is between each plurality of repetitions of a WUS and a quantity of paging occasions N included in the paging frame. For example, the first plurality of repetitions of the WUS may map to the N paging occasions included in the paging frame, the second plurality of repetitions of the WUS may map to the N paging occasions included in the paging frame, and so on.

In some aspects, the 1-to-N mapping illustrated in FIG. 4B may result in lower cell-common WUS overhead relative to the 1-to-1 mapping illustrated in FIG. 4A because the BS transmits fewer repetitions of a cell-common WUS. However, the BS may need to transmit a UE-specific WUS (or UE group specific WUS) to a UE due to the 1-to-N mapping (e.g., which may be referred to as a two-stage WUS). The UE-specific WUS may not be transmitted with repetition since it is not used for beam management but used to indicate that the BS is to transmit a paging communication to the UE in a subsequent paging occasion. In this case, the BS may configure another time offset between the end of the transmission of the repetitions of the cell-common WUS and the beginning of the transmission of the UE-specific WUS (e.g., which may transmitted without repetition) such that the UE is permitted to identify a beam pair before receiving the UE-specific WUS (e.g., based at least in part on the cell-common WUS) and the associated paging communication.

Accordingly, the BS may transmit a UE-specific WUS using one or more transmit beams and may transmit a paging communication using the one or more transmit beams based at least in part on transmitting the UE-specific WUS. The UE may receive the UE-specific WUS and associated paging communication transmitted on a transmit beam and using a receive beam included in a beam pair that is identified based at least in part on repetitions of the cell-common WUS.

Figure 4C:
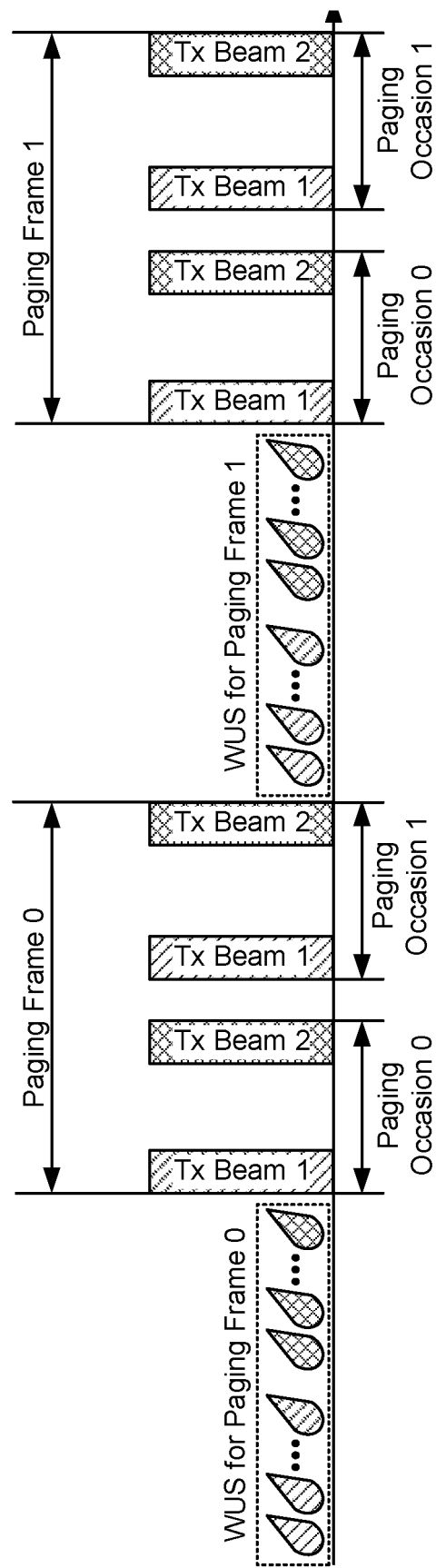

As shown in the example illustrated in FIG. 4C, a WUS configuration may include a configuration for a plurality of paging frames in a paging cycle (e.g., paging frame 0, paging frame 1, and so on). In some aspects, each of the plurality of paging frames may be configured with a 1-to-N mapping of pluralities of repetitions of a WUS to paging occasions and PDCCH monitoring occasions. In some aspects, each paging occasion may be associated with a different UE or a group of UEs.

As further shown in the example illustrated in FIG. 4C, the pluralities of repetitions of a WUS for paging frame 0 and the pluralities of repetitions of a WUS for paging frame 1 may be time division multiplexed such that the pluralities of repetitions of a WUS for paging frame 0 and the pluralities of repetitions of a WUS for paging frame 1 occupy different (non-overlapping) sets of time-domain resources.

Figure 4D:
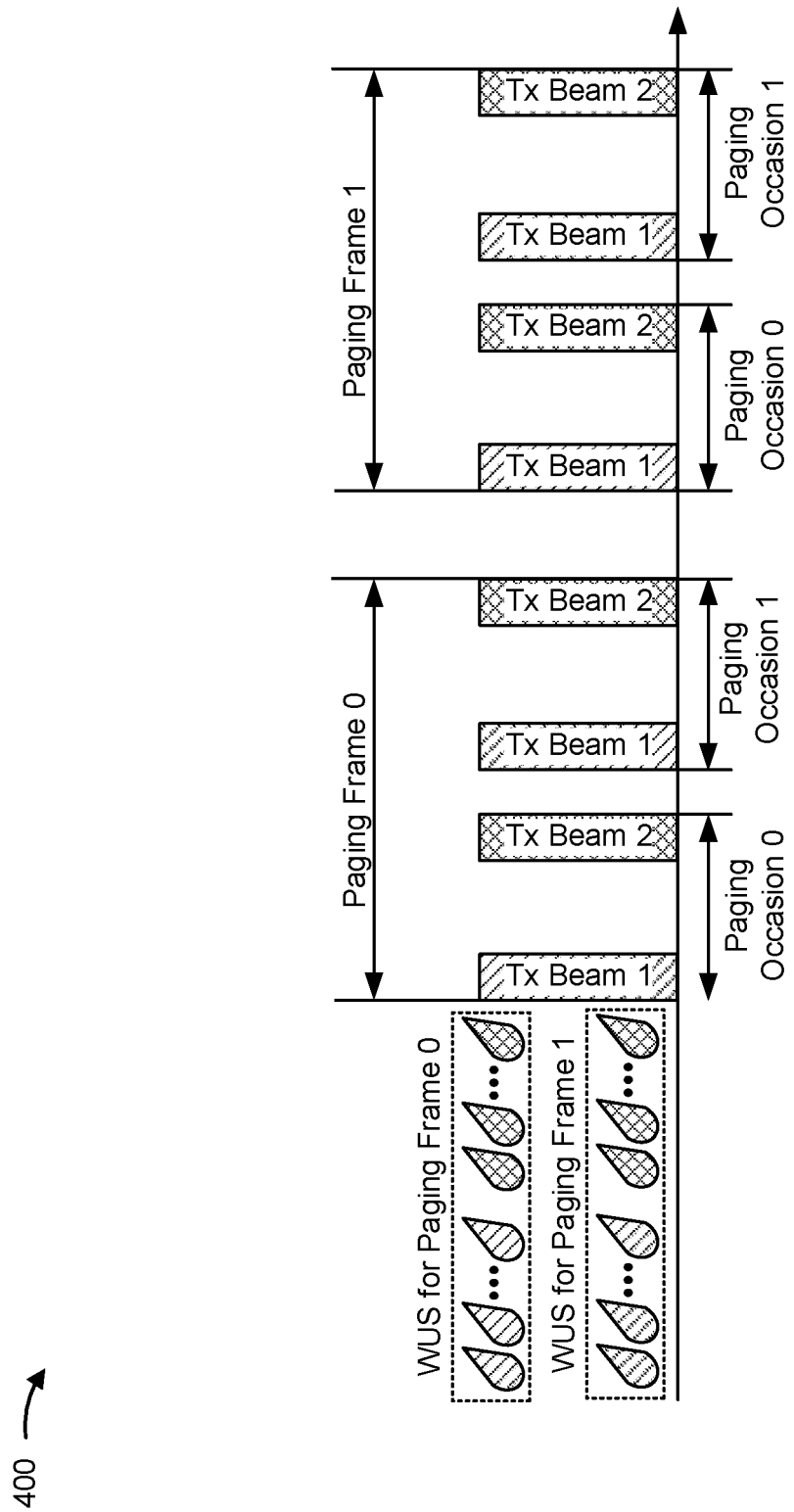

As shown in the example illustrated in FIG. 4D, a WUS configuration may include a configuration for a plurality of paging frames in a paging cycle (e.g., paging frame 0, paging frame 1, and so on). In some aspects, each of the plurality of paging frames may be configured with a 1-to-N mapping of pluralities of repetitions of a WUS to paging occasions and PDCCH monitoring occasions. In some aspects, each paging occasion may be associated with a different UE or a different group of UEs.

As further shown in the example illustrated in FIG. 4D, the pluralities of repetitions of a WUS for paging frame 0 and the pluralities of repetitions of a WUS for paging frame 1 may be frequency division multiplexed such that the pluralities of repetitions of a WUS for paging frame 0 and the pluralities of repetitions of a WUS for paging frame 1 occupy different (non-overlapping) sets of frequency-domain resources.

As indicated above, FIGS. 4A-4D are provided as examples. Other examples may differ from what is described with respect to FIGS. 4A-4D.

Figure 5:
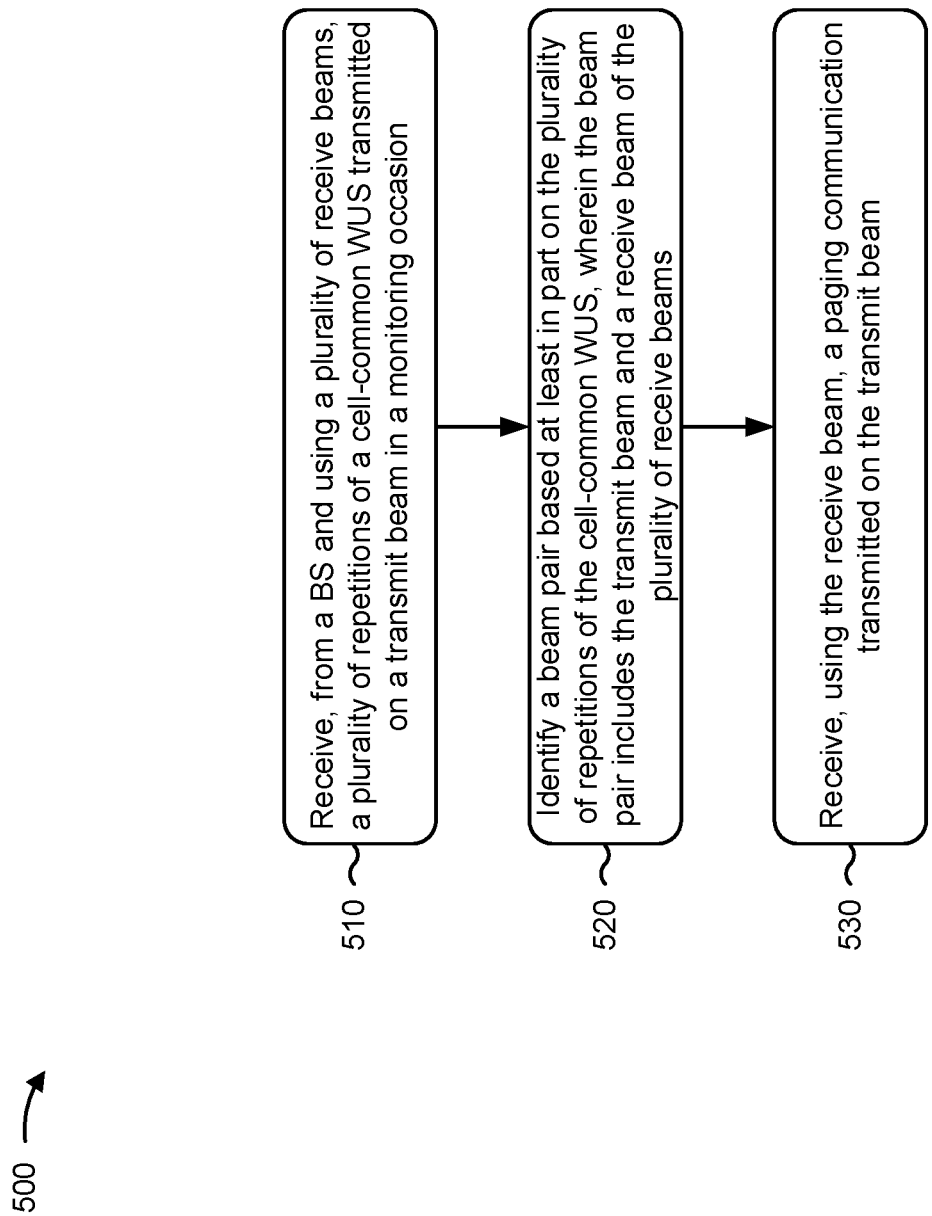
FIGS. 5 and 6 are flowcharts of methods of wireless communication.

FIG. 5 is a flowchart of a method 500 of wireless communication. The method may be performed by UE (e.g., the UE 120 of FIG. 1, the apparatus 702/702', and/or the like).

At 510, the UE may receive, from a BS (e.g., the BS 110 of FIG. 1, the apparatus 902/902', and/or the like) and using a plurality of receive beams, a plurality of repetitions of a cell-common WUS transmitted on a transmit beam in a monitoring occasion. For example, the UE may receive, using a plurality of receive beams, a plurality of repetitions of a cell-common WUS transmitted on a transmit beam in a monitoring occasion using antenna 252, DEMOD 254, receive processor 258, controller/processor 280, memory 282, and/or the like. In some aspects, the cell-common WUS is quasi-co-located with a synchronization signal block associated with the transmit beam. In some aspects, the plurality of repetitions of the cell-common WUS is associated with a same downlink spatial domain transmission filter. In some aspects, the cell-common WUS comprises at least one of a sequence mapped to a plurality of resource blocks in one or more orthogonal frequency division multiplexing symbols, a single-port channel state information reference signal, or a physical downlink channel (e.g., a PDCCH) based WUS. In some aspects, the UE is operating in an RRC idle mode. In some aspects, the plurality of repetitions of the cell-common WUS and the paging communication are received in a same bandwidth part different from a bandwidth part of a synchronization signal block.

At 520, the UE may identify a beam pair based at least in part on the plurality of repetitions of the cell-common WUS, wherein the beam pair includes the transmit beam and a receive beam of the plurality of receive beams. For example, the UE may identify a beam pair based at least in part on the plurality of repetitions of the cell-common WUS using receive processor 258, controller/processor 280, memory 282, and/or the like. In some aspects, the beam pair includes the transmit beam and a receive beam of the plurality of receive beams.

At 530, the UE may receive, using the receive beam, a paging communication transmitted on the transmit beam. For example, the UE may receive, using the receive beam, a paging communication transmitted on the transmit beam using antenna 252, DEMOD 254, receive processor 258, controller/processor 280, memory 282, and/or the like. In some aspects, the plurality of repetitions of the WUS and the paging communication are received in a same frequency range (e.g. in a same bandwidth part). In some aspects, the UE may receive, using the receive beam, a UE-specific WUS transmitted on the transmit beam and may receive, using the receive beam, the paging communication transmitted on the transmit beam based at least in part on receiving the UE-specific WUS. In some aspects, the UE may receive the paging communication in a paging occasion associated with the cell-common WUS, wherein the paging occasion occurs at a time offset after the plurality of repetitions of the cell-common WUS. In some aspects, the cell-common WUS is specific to the paging occasion and includes an indication to receive the paging communication. In some aspects, the cell-common WUS is associated with one or more other paging occasions.

Method 500 may include additional aspects, such as any single aspect or any combination of aspects described below and/or in connection with one or more other processes described elsewhere herein.

In some aspects, method 500 may further comprises receiving, using the plurality of receive beams, another plurality of repetitions of the cell-common WUS transmitted on another transmit beam in another monitoring occasion, and identifying the beam pair comprises identifying the beam pair based at least in part on the other plurality of repetitions of the cell-common WUS. In some aspects, the monitoring occasion and the other monitoring occasion are time-division multiplexed in a same radio frame.

In some aspects, the plurality of repetitions of the cell-common WUS and the paging communication are received in a same frequency range (e.g. in a same bandwidth part). In some aspects, the cell-common WUS is associated with one or more other paging occasions in a paging cycle, and method 500 includes receiving, using the receive beam, a UE-specific WUS that includes an indication to receive the paging communication in the paging occasion, wherein receiving the paging communication transmitted on the transmit beam includes receiving, using the receive beam, the paging communication transmitted on the transmit beam based at least in part on receiving the UE-specific WUS.

Although FIG. 5 shows example blocks of a method of wireless communication, in some aspects, the method may include additional blocks, fewer blocks, different blocks, or differently arranged blocks than those shown in FIG. 5. Additionally, or alternatively, two or more blocks shown in FIG. 5 may be performed in parallel.

Figure 6:
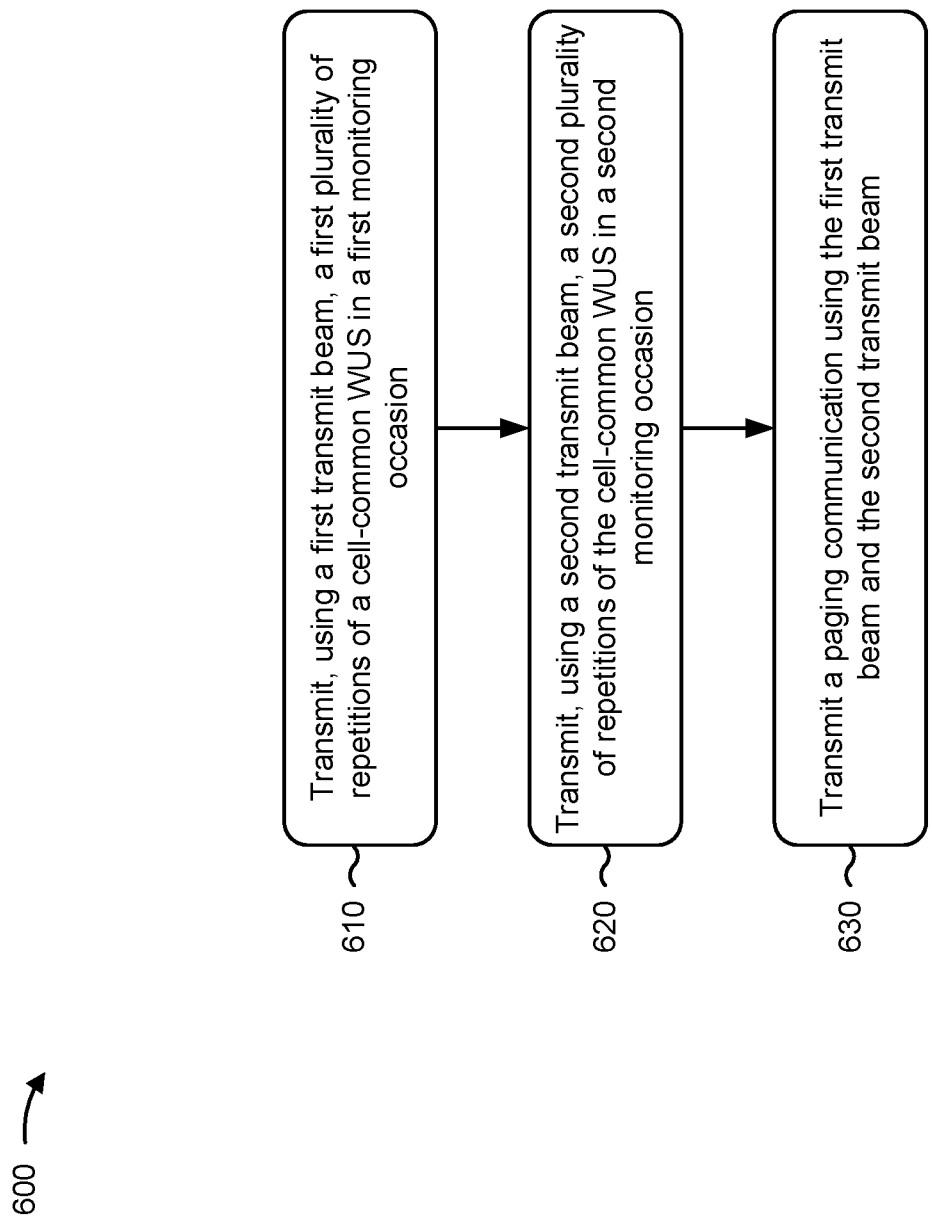

FIG. 6 is a flowchart of a method 600 of wireless communication. The method may be performed by BS (e.g., the BS 110 of FIG. 1, the apparatus 902/902', and/or the like).

At 610, the BS may transmit, using a first transmit beam, a first plurality of repetitions of a cell-common WUS in a first monitoring occasion. For example, the BS may transmit, using a first transmit beam, a first plurality of repetitions of a cell-common WUS in a first monitoring occasion using transmit processor 220, MOD 232, antenna 234, controller/processor 240, memory 242, and/or the like. In some aspects, the cell-common WUS is quasi-co-located with a synchronization signal block associated with the first transmit beam. In some aspects, the first plurality of repetitions of the cell-common WUS is associated with a same downlink spatial domain transmission filter. In some aspects, the BS may transmit the first plurality of repetitions of the cell-common WUS in the first monitoring occasion based at least in part on determining to transmit the paging communication to a UE (e.g., the UE 120 of FIG. 1, the apparatus 702/702', and/or the like). In some aspects, the cell-common WUS comprises at least one of a sequence mapped to a plurality of resource blocks in one or more orthogonal frequency division multiplexing symbols, a single-port channel state information reference signal, or a physical downlink channel based WUS.

At 620, the BS may transmit, using a second transmit beam, a second plurality of repetitions of the cell-common WUS in a second monitoring occasion. For example, the BS may transmit, using a second transmit beam, a second plurality of repetitions of the cell-common WUS in a second monitoring occasion using transmit processor 220, MOD 232, antenna 234, controller/processor 240, memory 242, and/or the like. In some aspects, the first monitoring occasion and the second monitoring occasion are time-division multiplexed in a same radio frame. In some aspects, the first monitoring occasion is based at least in part on a time offset between the first monitoring occasion and a starting symbol of the paging occasion.

At 630, the BS may transmit a paging communication using the first transmit beam and the second transmit beam. For example, the BS may transmit a paging communication using the first transmit beam and the second transmit beam using transmit processor 220, MOD 232, antenna 234, controller/processor 240, memory 242, and/or the like. In some aspects, the BS may transmit a UE-specific WUS using the first transmit beam and the second transmit beam and may transmit, using the first transmit beam and the second transmit beam, the paging communication based at least in part on transmitting the UE-specific WUS. In some aspects, the BS may transmit the paging communication in a paging occasion associated with the cell-common WUS.

In some aspects, the BS may transmit, using the first transmit beam, the paging communication in a first PDCCH monitoring occasion in the paging occasion and may transmit, using the second transmit beam, the paging communication in a second PDCCH monitoring occasion in the paging occasion, wherein the first PDCCH monitoring occasion and the second PDCCH monitoring occasion are included in a same radio frame. In some aspects, the first monitoring occasion is based at least in part on a time offset between the first monitoring occasion and a starting symbol of the first PDCCH monitoring occasion. In some aspects, the cell-common WUS is specific to the paging occasion and includes an indication to receive the paging communication. In some aspects, the cell-common WUS is associated with one or more other paging occasions.

In some aspects, the WUS is associated with one or more other paging occasions in a paging cycle, and method 500 includes transmitting a UE-specific WUS using the first transmit beam and the second transmit beam, the UE-specific WUS including an indication to receive the paging communication in the paging occasion, wherein transmitting the paging communication using the first transmit beam and the second transmit beam includes transmitting, using the first transmit beam and the second transmit beam, the paging communication based at least in part on transmitting the UE-specific WUS.

Method 600 may include additional aspects, such as any single aspect or any combination of aspects described below and/or in connection with one or more other processes described elsewhere herein.

In some aspects, method 600 further comprises transmitting, using the first transmit beam, a third plurality of repetitions of the cell-common WUS, wherein the first plurality of repetitions of the cell-common WUS is associated with a first paging occasion for a first UE, and wherein the third plurality of repetitions of the cell-common WUS is associated with a second paging occasion for a second UE. In some aspects, the first plurality of repetitions of the cell-common WUS is time division multiplexed with the third plurality of repetitions of the cell-common WUS. In some aspects, the first plurality of repetitions of the cell-common WUS is frequency division multiplexed with the third plurality of repetitions of the cell-common WUS.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
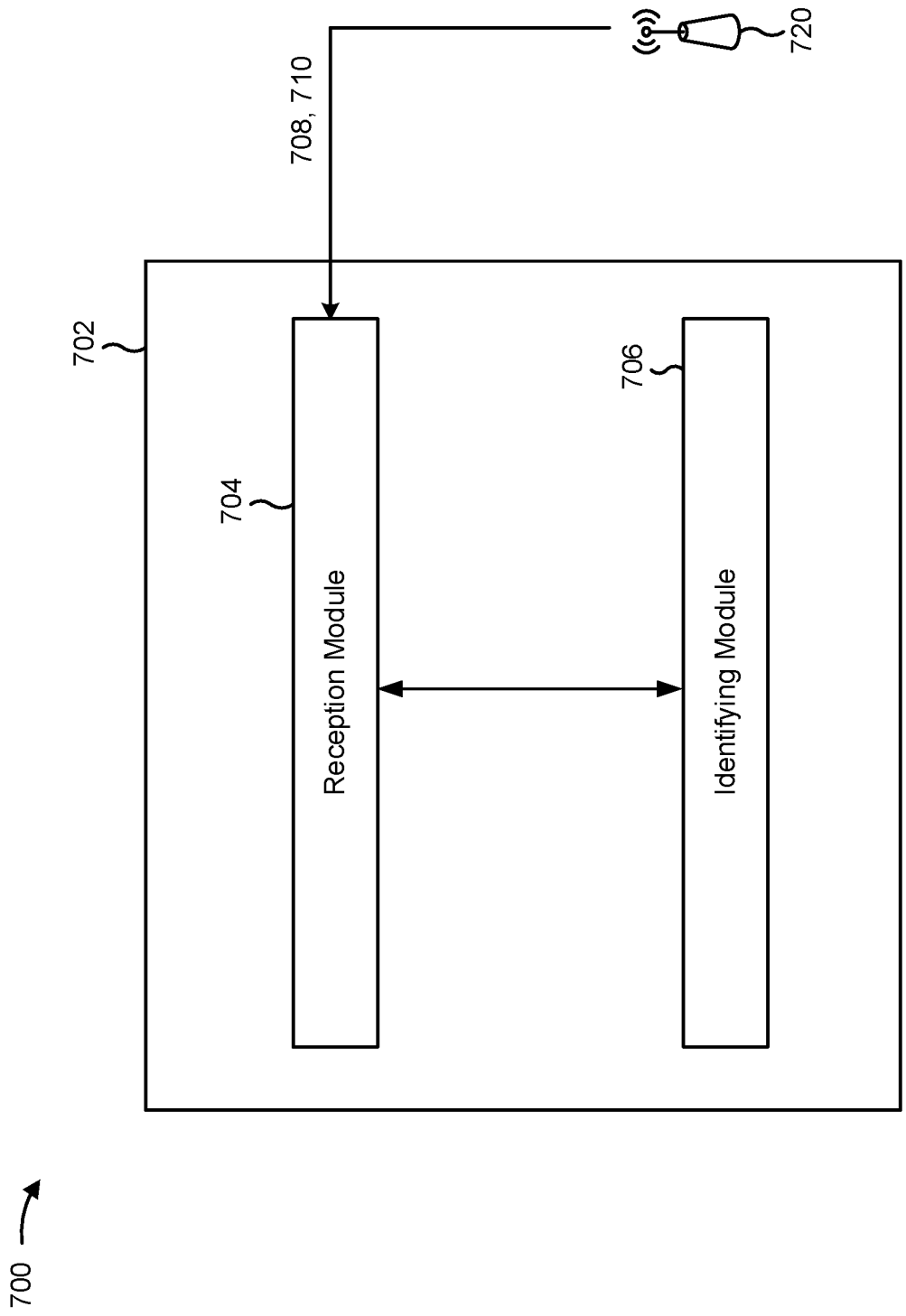
FIG. 7 is a conceptual data flow diagram illustrating the data flow between different modules/means/components in an example apparatus.

FIG. 7 is a conceptual data flow diagram 700 illustrating the data flow between different modules/means/components in an example apparatus 702. The apparatus 702 may be a UE (e.g., UE 120). In some aspects, the apparatus 702 includes a reception module 704 and an identifying module 706.

In some aspects, reception module 704 may receive a plurality of repetitions of a cell-common WUS 708. In some aspects, reception module 704 may receive the plurality of repetitions of the cell-common WUS 708 using a plurality of receive beams such that each repetition is received using a respective receive beam in a monitoring occasion. In some aspects, the plurality of repetitions of the cell-common WUS 708 may be transmitted by a BS 720 (e.g., BS 110) on a same transmit beam in the monitoring occasion. In some aspects, reception module 704 may include an antenna (e.g., antenna 252), a receive processor (e.g., receive processor 258), a controller/processor (e.g., controller/processor 280), a memory (e.g., a memory 282), and/or the like.

In some aspects, identifying module 706 may identify a beam pair based at least in part on reception module 704 receiving the plurality of repetitions of the cell-common WUS 708. In some aspects, the beam pair may include the transmit beam and a receive beam of the plurality of receive beams. In some aspects, identifying module 706 may include an a receive processor (e.g., receive processor 258), a controller/processor (e.g., controller/processor 280), a memory (e.g., a memory 282), and/or the like.

In some aspects, reception module 704 may receive a paging communication 710. In some aspects, reception module 704 may receive the paging communication using the receive beam included in the identified beam pair. In some aspects, the paging communication may be transmitted by BS 720 on the transmit beam included in the identified receive beam pair. In some aspects, reception module 704 may receive the paging communication 710 in a paging occasion associated with the transmit beam.

The apparatus may include additional modules that perform each of the blocks of the algorithm in the aforementioned method 500 of FIG. 5 and/or the like. Each block in the aforementioned method 500 of FIG. 5 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 7 are provided as an example. In practice, there may be additional modules, fewer modules, different modules, or differently arranged modules than those shown in FIG. 7. Furthermore, two or more modules shown in FIG. 7 may be implemented within a single module, or a single module shown in FIG. 7 may be implemented as multiple, distributed modules. Additionally, or alternatively, a set of modules (e.g., one or more modules) shown in FIG. 7 may perform one or more functions described as being performed by another set of modules shown in FIG. 7.

Figure 8:
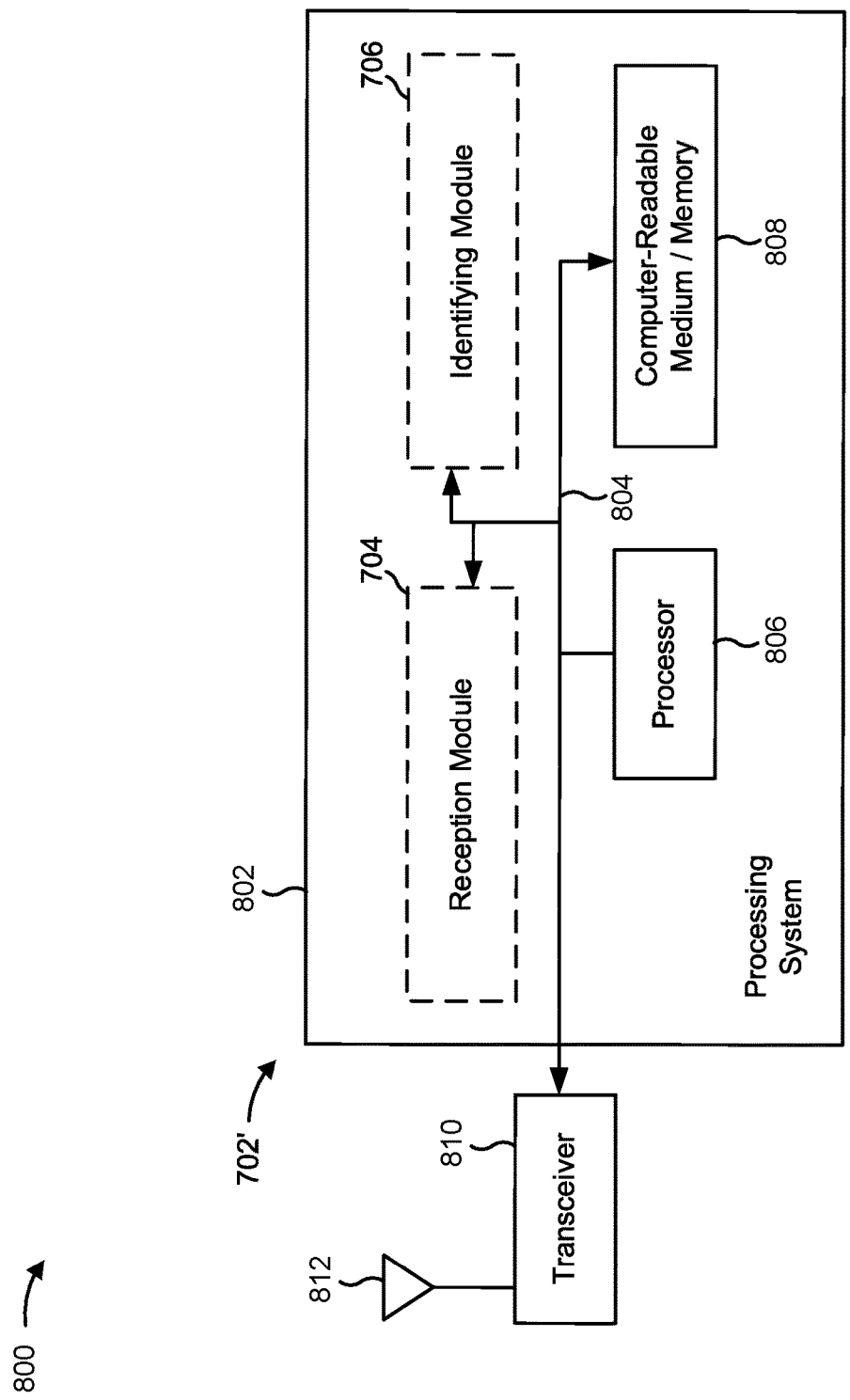
FIG. 8 is a diagram illustrating an example of a hardware implementation for an apparatus employing a processing system.

FIG. 8 is a diagram 800 illustrating an example of a hardware implementation for an apparatus 702' employing a processing system 802. The apparatus 702' may be a UE (e.g., UE 120).

The processing system 802 may be implemented with a bus architecture, represented generally by the bus 804. The bus 804 may include any number of interconnecting buses and bridges depending on the specific application of the processing system 802 and the overall design constraints. The bus 804 links together various circuits including one or more processors and/or hardware modules, represented by the processor 806, the modules 704 and 706, and the computer-readable medium/memory 808. The bus 804 may also link various other circuits such as timing sources, peripherals, voltage regulators, and power management circuits, which are well known in the art, and therefore will not be described any further.

The processing system 802 may be coupled to a transceiver 810. The transceiver 810 is coupled to one or more antennas 812. The transceiver 810 provides a means for communicating with various other apparatuses over a transmission medium. The transceiver 810 receives a signal from the one or more antennas 812, extracts information from the received signal, and provides the extracted information to the processing system 802, specifically the reception module 704. In addition, the transceiver 810 receives information from the processing system 802 and based at least in part on the received information, generates a signal to be applied to the one or more antennas 812. The processing system 802 includes a processor 806 coupled to a computer-readable medium/memory 808. The processor 806 is responsible for general processing, including the execution of software stored on the computer-readable medium/memory 808. The software, when executed by the processor 806, causes the processing system 802 to perform the various functions described herein for any particular apparatus. The computer-readable medium/memory 808 may also be used for storing data that is manipulated by the processor 806 when executing software. The processing system further includes at least one of the modules 704 and 706. The modules may be software modules running in the processor 806, resident/stored in the computer readable medium/memory 808, one or more hardware modules coupled to the processor 806, or some combination thereof. The processing system 802 may be a component of the UE 120 and may include the memory 282 and/or at least one of the TX MIMO processor 266, the RX processor 258, and/or the controller/processor 280.

In some aspects, the apparatus 702/702' for wireless communication includes means for receiving, from a BS and using a plurality of receive beams, a plurality of repetitions of a cell-common WUS transmitted on a transmit beam in a monitoring occasion, means for identifying a beam pair based at least in part on the plurality of repetitions of the cell-common WUS, wherein the beam pair includes the transmit beam and a receive beam of the plurality of receive beams, means for receiving, using the receive beam, a paging communication transmitted on the transmit beam, and/or the like. The aforementioned means may be one or more of the aforementioned modules of the apparatus 702 and/or the processing system 802 of the apparatus 702' configured to perform the functions recited by the aforementioned means. As described elsewhere herein, the processing system 802 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

Figure 9:
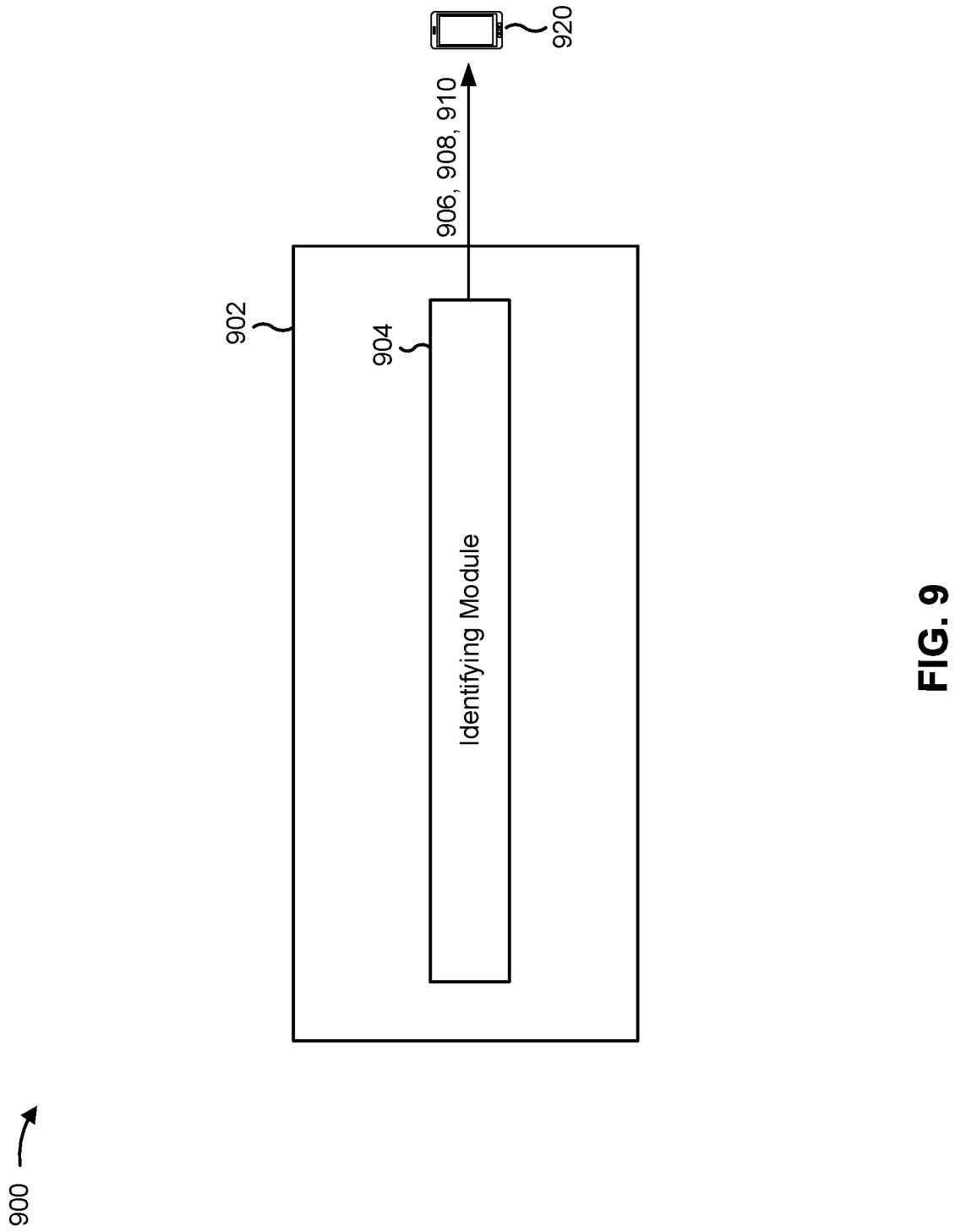
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be a BS (e.g., BS 110). In some aspects, the apparatus 902 includes a transmission module 904.

In some aspects, transmission module 904 may transmit, using a first transmit beam, a first plurality of repetitions 906 of a cell-common WUS in a first monitoring occasion. In some aspects, transmission module 904 may transmit, using a second transmit beam, a second plurality of repetitions 908 of the cell-common WUS in a second monitoring occasion. In some aspects, the plurality of repetitions of the cell-common WUS 708 may be transmitted by a BS 720 (e.g., BS 110) on a same transmit beam in the monitoring occasion. In some aspects, transmission module 904 may transmit a paging communication 910 using the first transmit beam and the second transmit beam. In some aspects, transmission module 904 may include an antenna (e.g., antenna 234), a transmit processor (e.g., transmit processor 220), a controller/processor (e.g., controller/processor 240), a memory (e.g., a memory 242), and/or the like.

The apparatus may include additional modules that perform each of the blocks of the algorithm in the aforementioned method 600 of FIG. 6 and/or the like. Each block in the aforementioned method 600 of FIG. 6 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
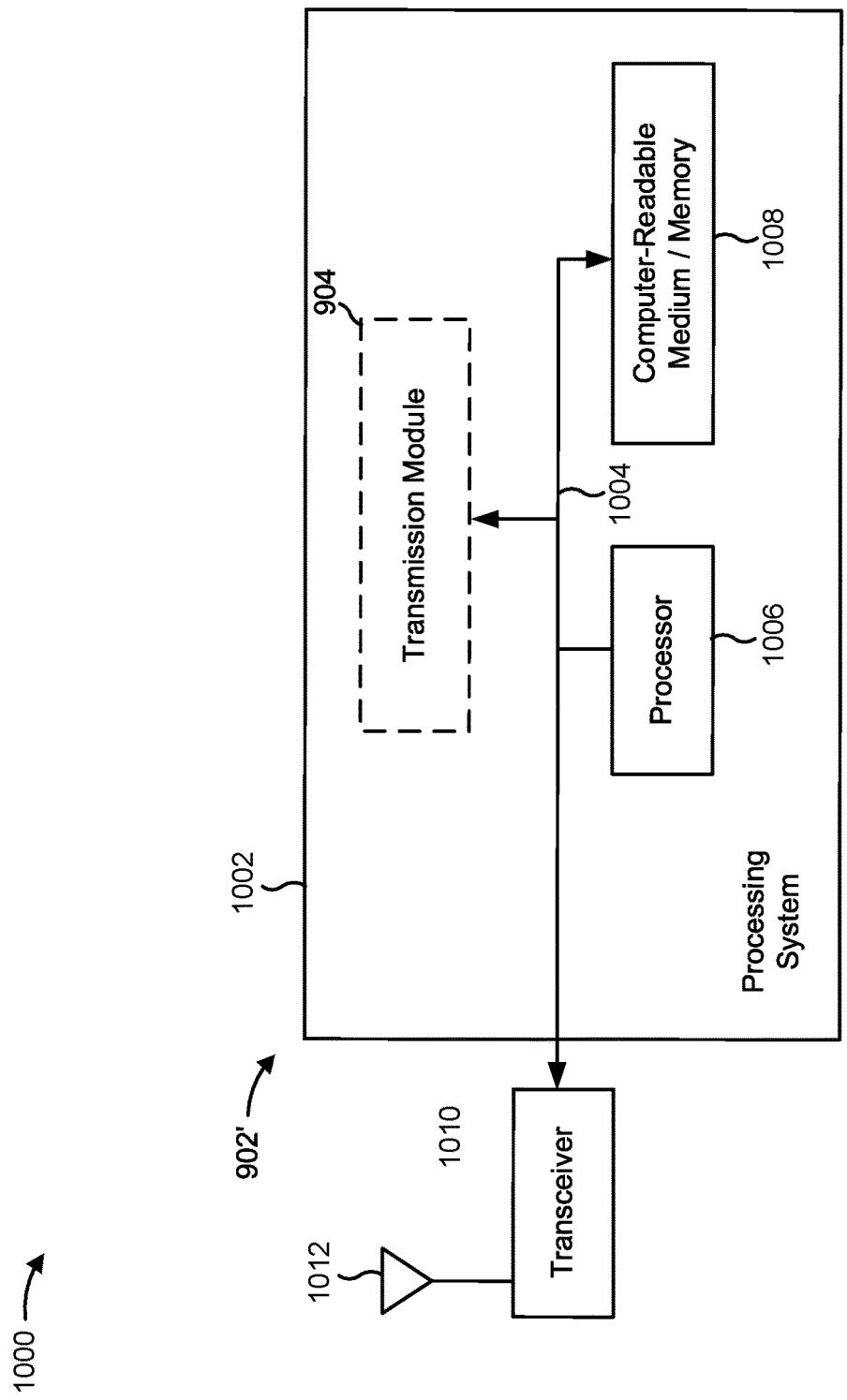
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a BS (e.g., BS 110).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the module 904, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002. In addition, the transceiver 1010 receives information from the processing system 1002, specifically the transmission module 904, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the modules 904. The modules may be software modules running in the processor 1006, resident/stored in the computer readable medium/memory 1008, one or more hardware modules coupled to the processor 1006, or some combination thereof. The processing system 1002 may be a component of the BS 110 and may include the memory 242 and/or at least one of the TX MIMO processor 230, the RX processor 238, and/or the controller/processor 240.

In some aspects, the apparatus 902/902' for wireless communication includes means for transmitting, using a first transmit beam, a first plurality of repetitions of a cell-common WUS in a first monitoring occasion, means for transmitting, using a second transmit beam, a second plurality of repetitions of the cell-common WUS in a second monitoring occasion, means for transmitting a paging communication using the first transmit beam and the second transmit beam, and/or the like. The aforementioned means may be one or more of the aforementioned modules of the apparatus 902 and/or the processing system 1002 of the apparatus 902' configured to perform the functions recited by the aforementioned means. As described elsewhere herein, the processing system 1002 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 10 is provided as an example. Other examples may differ from what is described in connection with FIG. 10.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving, from a base station (BS) and using a plurality of receive beams, a plurality of repetitions of a cell-common wakeup signal (WUS), each repetition transmitted on a same transmit beam in a monitoring occasion;
   identifying a beam pair based at least in part on the plurality of repetitions of the cell-common WUS,
      wherein the beam pair includes the transmit beam and a receive beam of the plurality of receive beams; and
   receiving, using the receive beam, a paging communication transmitted on the transmit beam.

2. The method of claim 1, wherein the UE is operating in a radio resource control (RRC) idle mode.

3. The method of claim 1, wherein the cell-common WUS is quasi-co-located with a synchronization signal block associated with the transmit beam.

4. The method of claim 1, further comprising:
   receiving, using the plurality of receive beams, another plurality of repetitions of the WUS transmitted on another transmit beam in another monitoring occasion; and
   wherein identifying the beam pair comprises:
      identifying the beam pair based at least in part on the other plurality of repetitions of the cell-common WUS.

5. The method of claim 4, wherein the monitoring occasion and the other monitoring occasion are time-division multiplexed in a same radio frame.

6. The method of claim 1, wherein the plurality of repetitions of the cell-common WUS and the paging communication are received in a same bandwidth part different than a bandwidth part of a synchronization signal block.

7. The method of claim 1, wherein receiving the paging communication comprises:
   receiving the paging communication in a paging occasion associated with the cell-common WUS,
      wherein the paging occasion occurs at a time offset after the plurality of repetitions of the cell-common WUS.

8. The method of claim 7, wherein the cell-common WUS is specific to the paging occasion and includes an indication to receive the paging communication.

9. The method of claim 7, wherein the cell-common WUS is associated with one or more other paging occasions in a paging cycle;
   wherein the method further comprises:
      receiving, using the receive beam, a UE-specific WUS that includes an indication to receive the paging communication in the paging occasion; and
   wherein receiving the paging communication transmitted on the transmit beam comprises:
      receiving, using the receive beam, the paging communication transmitted on the transmit beam based at least in part on receiving the UE-specific WUS.

10. The method of claim 1, wherein the cell-common WUS comprises at least one of:
   a sequence mapped to a plurality of resource blocks in one or more orthogonal frequency division multiplexing symbols, a single-port channel state information reference signal, or a physical downlink channel based WUS.

11. A method of wireless communication performed by a base station (BS), comprising:
transmitting, using a first transmit beam, a first plurality of repetitions of a cell-common wakeup signal (WUS) in a first monitoring occasion;
transmitting, using a second transmit beam, a second plurality of repetitions of the cell-common WUS in a second monitoring occasion; and
transmitting a paging communication using the first transmit beam and the second transmit beam.

12. The method of claim 11, wherein the cell-common WUS is quasi-co-located with a synchronization signal block associated with the first transmit beam.

13. The method of claim 11, wherein the first monitoring occasion and the second monitoring occasion are time-division multiplexed in a same radio frame.

14. The method of claim 11, wherein the first plurality of repetitions of the cell-common WUS is associated with a same downlink spatial domain transmission filter.

15. The method of claim 11, wherein transmitting the first plurality of repetitions of the cell-common WUS in the first monitoring occasion comprises:
transmitting the first plurality of repetitions of the WUS in the first monitoring occasion based at least in part on determining to transmit the paging communication to a user equipment (UE).

16. The method of claim 11, wherein transmitting the paging communication using the first transmit beam and the second transmit beam comprises:
transmitting the paging communication in a paging occasion associated with the cell-common WUS.

17. The method of claim 16, wherein transmitting the paging communication in the paging occasion associated with the cell-common WUS comprises:
transmitting, using the first transmit beam, the paging communication in a first PDCCH monitoring occasion in the paging occasion; and
transmitting, using the second transmit beam, the paging communication in a second PDCCH monitoring occasion in the paging occasion,
wherein the first PDCCH monitoring occasion and the second PDCCH monitoring occasion are included in a same radio frame.

18. The method of claim 17, wherein the first monitoring occasion is based at least in part on a time offset between the first monitoring occasion and a starting symbol of the paging occasion.

19. The method of claim 17, wherein the first monitoring occasion is based at least in part on a time offset between the first monitoring occasion and a starting symbol of the first PDCCH monitoring occasion.

20. The method of claim 17, wherein the cell-common WUS is specific to the paging occasion and includes an indication to receive the paging communication.

21. The method of claim 17, wherein the WUS is associated with one or more other paging occasions in a paging cycle;
wherein the method further comprises:
transmitting a UE-specific WUS using the first transmit beam and the second transmit beam, the UE-specific WUS including an indication to receive the paging communication in the paging occasion; and
wherein transmitting the paging communication using the first transmit beam and the second transmit beam comprises:
transmitting, using the first transmit beam and the second transmit beam, the paging communication based at least in part on transmitting the UE-specific WUS.

22. The method of claim 11, further comprising:
transmitting, using the first transmit beam, a third plurality of repetitions of the cell-common WUS,
wherein the first plurality of repetitions of the cell-common WUS is associated with a first paging occasion for a first UE, and
wherein the third plurality of repetitions of the cell-common WUS is associated with a second paging occasion for a second UE.

23. The method of claim 22, wherein the first plurality of repetitions of the cell-common WUS is time division multiplexed with the third plurality of repetitions of the cell-common WUS.

24. The method of claim 22, wherein the first plurality of repetitions of the cell-common WUS is frequency division multiplexed with the third plurality of repetitions of the cell-common WUS.

25. The method of claim 11, wherein the cell-common WUS comprises at least one of:
a sequence mapped to a plurality of resource blocks in one or more orthogonal frequency division multiplexing symbols,
a single-port channel state information reference signal, or
a physical downlink channel based WUS.

26. A user equipment (UE) for wireless communication, comprising:
a memory; and
one or more processors coupled to the memory, the memory and the one or more processors configured to:
receive, from a base station (BS) and using a plurality of receive beams, a plurality of repetitions of a cell-common wakeup signal (WUS)), each repetition transmitted on a same transmit beam in a monitoring occasion;
identify a beam pair based at least in part on the plurality of repetitions of the cell-common WUS,
wherein the beam pair includes the transmit beam and a receive beam of the plurality of receive beams; and
receive, using the receive beam, a paging communication transmitted on the transmit beam.

27. The UE of claim 26, wherein the one or more processors, when receiving the paging communication, are configured to:
receive the paging communication in a paging occasion associated with the cell-common WUS,
wherein the paging occasion occurs at a time offset after the plurality of repetitions of the cell-common WUS.

28. The UE of claim 27, wherein the cell-common WUS is associated with one or more other paging occasions in a paging cycle;
wherein the one or more processors are further configured to:
receive, using the receive beam, a UE-specific WUS that includes an indication to receive the paging communication in the paging occasion; and wherein the one or more processors, when receiving the paging communication transmitted on the transmit beam, are configured to:
receive, using the receive beam, the paging communication transmitted on the transmit beam based at least in part on receiving the UE-specific WUS.

29. A base station (BS) for wireless communication, comprising:
a memory; and
one or more processors coupled to the memory, the memory and the one or more processors configured to:
transmit, using a first transmit beam, a first plurality of repetitions of a cell-common wakeup signal (WUS) in a first monitoring occasion;
transmit, using a second transmit beam, a second plurality of repetitions of the WUS in a second monitoring occasion; and
transmit a paging communication using the first transmit beam and the second transmit beam.

30. The BS of claim 29, wherein the one or more processors are further configured to:
transmit a UE-specific WUS using the first transmit beam and the second transmit beam; and
wherein the one or more processors, when transmitting the paging communication using the first transmit beam and the second transmit beam, are to:
transmit, using the first transmit beam and the second transmit beam, the paging communication based at least in part on transmitting the UE-specific WUS.

\* \* \* \* \*